United States Patent Office 2,890,008
Patented June 9, 1959

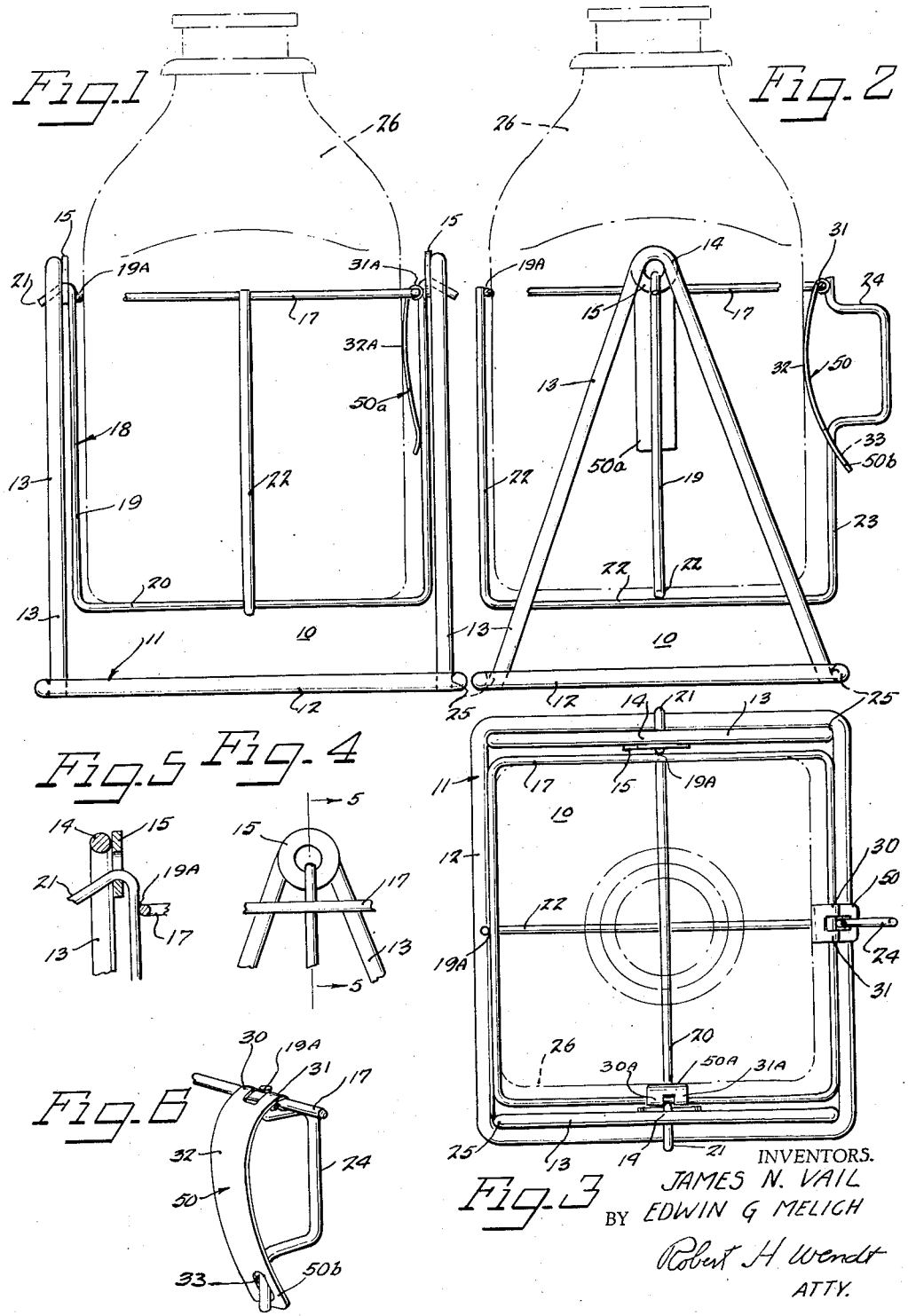

2,890,008

MILK CONTAINER DISPENSING UNITS

Edwin G. Melich and James N. Vail, Chicago, Ill.

Application June 2, 1958, Serial No. 739,197

2 Claims. (Cl. 248—142)

The present invention relates to milk container dispensing units, and is particularly concerned with improved dispensing units for milk containers in the form of cartons, bottles, and the like.

This application is a continuation-in-part of our prior application, filed August 22, 1956, Ser. No. 605,575.

One of the objects of the invention is the provision of an improved milk container dispensing unit by means of which milk may be poured evenly and without spilling from a milk container, and in which there is no likelihood that the container will be dropped or that spilling will be caused by the lack of gripping power on the part of the user.

Another object of the invention is the provision of an improved milk container dispensing unit which is adapted to maintain the milk bottle or carton in upright position, and which is adapted to support it while the container is readily tilted with ease by children or other persons not having the strength to grip a large milk carton or container.

Another object of the invention is the provision of an improved tilting frame for milk bottles and cartons which is adapted to be economically manufactured, and which can be made to grip and fit the standard milk containers or cartons or bottles, even though there is considerable variation in size of both the containers and the supporting frames.

Another object of the invention is the provision of an improved tilting frame for milk containers which eliminates the necessity for gripping the large carton or bottle and provides the user with a convenient handle that can be gripped in the hands of even a very small child.

Another object of the invention is the provision of an improved tilting milk container support which is adapted to grip the container in such manner that even when the container is tilted at a maximum angle, it cannot slide out of the frame.

Another object of the invention is the provision of an improved tilting milk container support which will slide on the shelves without catching and which is provided with a knife edge suspension, permitting even and easy tilting of the heaviest cartons.

Another object of the invention is the provision of a tilting support for milk containers which has the tilting frame separable from the fixed frame, but in which the parts are assembled by a hook and eye arrangement, thereby providing a positive connection, and eliminating the possibility of any accidental disconnection of the parts.

Another object of the invention is the provision of an interchangeable construction which may be used both for glass bottles and cartons.

One of the most important objects of the invention is the provision of an improved dispensing unit for milk bottles which is adapted to receive, fit and grip glass bottles of the approximate size in spite of variations in size which occur in different batches of bottles made by the same manufacturer or variations between bottles of different manufacturers.

Other objects and advantages of the invention will be apparent from the following description and the accompanying drawings, in which similar characters of reference indicate similar parts throughout the several views.

Referring to the drawings,

Fig. 1 is a front elevational view of a tilting milk carton support embodying the invention;

Fig. 2 is a side elevational view with an alternative position shown in dotted lines;

Fig. 3 is a top plan view;

Fig. 4 is a fragmentary elevational view of the hook connection between the tilting frame and the supporting frame;

Fig. 5 is a fragmentary sectional view taken on the plane of the line 5—5 of Fig. 4;

Fig. 6 is a view in perspective of the bottle gripping spring.

Referring to Figs. 1–4, the tilting milk container support is indicated in its entirety by the numeral 10; and it includes a supporting frame 11 for pivotally mounting a tilting basket 18. The supporting frame is preferably made of round wire; and it includes a base 12, which is made of a wire bent into rectangular form, having its ends secured together.

The base 11 supports a pair of V shaped columns 13, 13, the lower ends of which are located to engage the corners of the frame 11, where these ends are welded at 25. At each apex 14 of the V shaped columns there is a metal washer 15, which is welded to the apex in such manner that its upper surface is flush with the rounded apex; and the washers are located parallel to each other and at the same height, serving as bearings for the tilting frame 18.

The tilting frame 18 includes an upper substantially rectangular frame member 17, which is of such size that it will receive the glass milk bottle, such as the half gallon size, which is shown in dash lines, in the figures, with a suitable clearance so that all sizes of half gallon bottles may be received in the frame member 17. Although the bottle may be loose in the frame 17, this looseness is eliminated by the use of a spring 50, further to be described.

There are a pair of U shaped wire members in the tilting frame 18, one of which is indicated at 19, with its bottom at 20; and the upwardly extending ends of this U shaped member are formed with downwardly turned hooks 21. These hooks can be inserted in the holes of the washers 15 by bending the columns 13, 13 as required. The legs 19 of this U shaped member are welded to the outside of the rectangular frame 17 at 19a.

Another U-shaped member 22 has its legs welded to the U-shaped frame member at their upper ends and is also welded to the yoke 20 of the other U-shaped member at the point where these wires cross. The U-shaped member 22, 23 is formed with an outwardly projecting handle 24 on one side, permitting the user to grip the handle when the tilting frame is filled with a bottle.

The frame has a generous clearance about the bottle, so that the frame will permit the insertion of any gallon bottle regardless of manufacturing variations. To take up the looseness between the frame and bottle 26, which is shown in dotted lines, a spring 50 is provided on the leg 23 of the U-shaped member 22.

This spring 50 may be made of stainless steel sheet metal and has two spaced prongs 30, 31 at the top, one on each side of handle 24; and the prongs 30, 31 are curled about the top frame 17, securing the spring at its top for a limited pivotal movement.

The spring 50 is bowed inward at 32 so that it will engage even the smallest half gallon bottle and urge it to the other side of frame 17, where bottle 26 is gripped. At its lower end 50b spring 50 has an elongated aperture 33 receiving and sliding on wire leg 23 below handle 24. As the spring straightens it becomes longer and its lower end slides down the wire 23. The curved prongs 30, 31 keep the spring 30 facing the bottle and permit the upper end to pivot as the spring bends.

Another similar spring 50a is mounted on leg number 17 of basket 18 by curved portions 31A and is inwardly bowed at 32A. The lower end 50b of said spring engages the side of leg 19. Thus the bottle is gripped by two springs.

The present frame will thus fit all half gallon bottles, despite variations in dimensions.

The operation of this device is as follows:

The carton is pressed into the tilting frame 18; and the height of the side columns 12 and 13 and depth of the tilting frame 18 is such that the center of gravity is below the point of pivot on the hooks 21 in washers 15.

It will thus be observed that we have invented improved tilting supports for milk bottles and cartons, which will maintain the milk containers in upright position at all times to avoid spilling, yet which permit tilting with one hand to pour out any amount desired.

These tilting supports can be handled by children and others whose hands are too small to grip the large bottles.

The base frames will slide readily on refrigerator shelves without catching; and the tilting frames will fit cartons and rigid glass bottles regardless of variations in size.

The hook and washer pivots operate with a minimum amount of friction like a knife edge pivot; and the present devices may be manufactured at a very low cost.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States.

1. A tilting support for milk bottles comprising a wire frame having a stable base and two upwardly extending frame members with bearings at their tops, a tilting frame having a basket embracing the sides of a milk bottle loosely and supporting the bottom of the milk bottle, said tilting frame having hook trunnions in said bearings, and a leaf spring carried by the basket and gripping the bottle, said basket having U-shaped wires supporting the bottle and having an upper rectangular frame embracing the bottle and secured to the upper ends of the legs of the U-shaped wires, said leaf spring having a pair of spaced prongs located on opposite sides of one of said legs and curled about the adjacent portion of said rectangular frame to provide a pivotal mounting for said spring, said spring having a lower end engaged with the inner side of a leg to urge the bottle toward an opposite leg of the basket.

2. A tilting support for milk bottles comprising a wire frame having a stable base and two upwardly extending frame members with bearings at their tops, a tilting frame having a basket embracing the sides of a milk bottle loosely and supporting the bottom of the milk bottle, said tilting frame having hook trunnions in said bearings, and a leaf spring carried by the basket and gripping the bottle, said basket having U-shaped wires supporting the bottle and having an upper rectangular frame embracing the bottle and secured to the upper ends of the legs of the U-shaped wires, said leaf spring having a pair of spaced prongs located on opposite sides of one of said legs and curled about the adjacent portion of said rectangular frame to provide a pivotal mounting for said spring, said spring being bowed inwardly far enough to engage any bottle inserted in said basket, and having its lower end provided with an elongated aperture receiving said latter leg.

References Cited in the file of this patent

UNITED STATES PATENTS

| | | |
|---|---|---|
| 932,344 | Starbard | Aug. 24, 1909 |
| 1,235,358 | Mayfield | July 31, 1917 |
| 2,050,909 | Woodall | Aug. 11, 1936 |
| 2,137,984 | Rumore | Nov. 22, 1938 |
| 2,298,577 | McPhail | Oct. 13, 1942 |
| 2,619,951 | Kahn | Dec. 2, 1952 |

FOREIGN PATENTS

| | | |
|---|---|---|
| 161,966 | Australia | Mar. 16, 1955 |